United States Patent [19]

Schwartz et al.

[11] Patent Number: 5,209,950
[45] Date of Patent: May 11, 1993

[54] COMPOSITION FOR SIC PACK CEMENTATION COATING OF CARBONACEOUS SUBSTRATES

[75] Inventors: Ira C. Schwartz, Marina Del Rey; Orlando L. Noche, Gardena; Keith Klein, Torrance, all of Calif.

[73] Assignee: BP Chemicals (Hitco) Inc., Gardena, Calif.

[21] Appl. No.: 368,501

[22] Filed: Jun. 19, 1989

[51] Int. Cl.$^5$ .................. C23C 16/22; C23C 16/40
[52] U.S. Cl. .................. 427/252; 427/249; 427/255.4; 427/189; 427/193; 427/201; 427/376.2; 427/397.7; 427/402
[58] Field of Search .............. 427/154, 249, 255.4, 427/189, 193, 201, 376.2, 397.7, 402, 252

[56] References Cited

U.S. PATENT DOCUMENTS

| | | | |
|---|---|---|---|
| 4,425,407 | 1/1984 | Galasso et al. | 427/249 |
| 4,465,777 | 12/1982 | Shuford | 427/419.7 |
| 4,476,164 | 6/1982 | Veltri et al. | 427/249 |
| 4,476,178 | 10/1984 | Veltri et al. | 427/255.4 |
| 4,544,412 | 6/1984 | Veltri et al. | 106/286.5 |
| 4,559,270 | 12/1985 | Sara | 427/376.2 |
| 4,585,675 | 8/1983 | Shuford | 427/376.2 |
| 4,722,817 | 2/1988 | Nakano et al. | 427/376.2 |
| 4,830,919 | 5/1989 | Shuford | 428/408 |

*Primary Examiner*—Donald P. Walsh
*Assistant Examiner*—Daniel Jenkins
*Attorney, Agent, or Firm*—Renner, Kenner, Greive, Bobak, Taylor & Weber

[57] ABSTRACT

This invention relates to an improved pack mixture composition useful for the formation of a SiC pack cementation coating for protecting a carbonaceous substrate from degradation at temperatures above about 800° F. comprising: Si from about 15% to about 50% by weight of the total composition; B up to about 25% by weight of the total composition when present; $SiO_2$ from about 0.01% to about 3% by weight of the total composition; and SiC from about 40% to about 85% by weight of the total composition and method thereof.

The invention further relates to a cork release agent composition for providing the clean release of spent pack composition from a carbonaceous substrate.

14 Claims, No Drawings

5,209,950

COMPOSITION FOR SIC PACK CEMENTATION COATING OF CARBONACEOUS SUBSTRATES

FIELD OF THE INVENTION

The present invention relates to an improved pack mixture composition used in the formation of a SiC pack cementation coating for imparting oxidation resistance to carbonaceous substrates.

BACKGROUND

Carbonaceous substrates, and more specifically carbon-carbon composites are widely used in the aerospace and aviation industries due to the physical and mechanical properties of such materials. The high strength-to-weight ratio of carbon-carbon composites provides weight savings to aircraft components. This characteristic, coupled with the mechanical strength, toughness and dimensional stability of carbon-carbon composites to temperatures in excess of 4000° F makes these materials ideal for aerospace applications.

A potentially limiting characteristic of carbon-carbon composites is that such materials tend to rapidly oxidize at temperatures above 800° F. in oxygen-containing environments. The degradation of the material due to oxidation causes loss of mechanical and physical properties. This problem must be prevented in order for these materials to be effectively used for aerospace applications, such as turbine engine exhaust nozzles and the space shuttle leading edge, where temperatures often exceed 2000° F. for extended periods of time.

One solution to the problem of carbonaceous substrate degradation at elevated temperatures is to coat the substrate surface with SiC. A silicon carbide coating effectively protects the carbonaceous substrate from degradation by providing a barrier to oxygen diffusion. Coating the material with silicon carbide may be accomplished by pack cementation, chemical vapor deposition or other viable processing techniques.

U.S. Pat. Nos. 4,544,412 and 4,476,164 teach a powdered pack mixture and a pack cementation process used to produce SiC conversion coatings on carbon-carbon materials. The pack mixture defined consists of roughly 60% SiC powder, 30% Si powder, 1% B powder and 9% $Al_2O_3$ powder.

U.S. Pat. No. 4,465,777 also discloses a boron-containing pack mixture composition for use in the protection of carbon-based materials. The pack contains from 25% to 40% Si, from 50% to 70% SiC, and from 1% to 15% B, with a minor amount of MgO, usually as an impurity in the boron. This reference further discloses the use of filter paper and filter paper pulp release agents. Impregnation of the substrate with tetraethylorthosilicate and/or heat treatment prior to the cementation process in an attempt to increase coating pick-up is also disclosed.

U.S. Pat. No. 4,585,675 relates to pack cementation formulation of silicon carbide protective coatings for carboncarbon substrates. This patent teaches a powdered pack mixture composition of 40%–50% Si, 30%–50% SiC and 20%–30% $Al_2O_3$ that is reacted with the surface of a carbonaceous substrate to provide a primary SiC coating for protection against the degradation of carbon-carbon substrates at high temperatures. An enhancement coating, used to seal the primary coating, is also disclosed. This patent further discusses a hand tamped packing method and an alternative time saving process in which a slurry form of the reactive pack mixture is poured around the part in a graphite retort.

Relatively recent technology improvements in the formulation and densification of carbon-carbon substrates have made it increasingly difficult to form a silicon carbide coating thereon with established pack cementation techniques. To enable coating of some of the newer carbon-carbon substrates, more reactivity is required of the pack mixture.

Further, difficulty is typically encountered in removing the pack mixture from the coated part surface after cementation particularly when boron is a pack mixture ingredient. Attempts have been made by others to circumvent the problem by keeping the boron content of the pack mixture extremely low, i.e. less than about 1%, or by using carbonaceous substances such as filter paper or filter paper pulp as a pack release agent. The filter paper is deficient in that it shrinks and cracks away from the part surface, directly exposing it to the reactive pack ingredients and resulting in pack sticking. Also, parts with complex configurations are difficult to wrap, making filter paper a poor alternative for use on such articles. Because of its fibrous nature, filter paper pulp tends to clog the spray devices used to apply it to the part surface. A less expensive, more readily sprayable alternative material for a release agent is needed to address these problems.

Given the foregoing drawbacks, what is needed is a pack mixture composition that increases the degree of silicon carbide coating formation. Further, a means of ensuring that such compositions will easily release from the substrate after pack cementation is also needed.

It is, therefore, one object of the present invention to provide a pack mixture composition for coating carbonaceous substrates which will impede the degradation of the substrate by oxidation at high temperatures.

It is another object of the present invention to provide a means for the clean release of expended pack mixture from the substrate.

These and other objects of the present invention will become apparent to those skilled in the art in the description of the invention that follows, and in the examples and claims appended hereto.

SUMMARY OF THE INVENTION

This invention relates to a novel pack mixture composition comprising: Si from about 15% to about 50% by weight of the total composition; B up to about 25% by weight of the total composition when present; $SiO_2$ from about 0.01% to about 3% by weight of the total composition; and SiC from about 40% to about 85% by weight of the total composition, useful for the formation of a SiC pack cementation coating for protecting a carbonaceous substrate from degradation at temperatures above about 800° F.

The invention also relates to a method for protecting a carbonaceous substrate from degradation at temperatures above about 800° F. comprising: preparing a pack mixture composition of from about 15% to about 50% Si, up to about 25% B, from about 0.01% to about 3% $SiO_2$ and from about 40% to about 85% SiC, all by weight of the total pack mixture composition; coating the carbonaceous substrate with a release agent; contacting the release agent-coated carbonaceous substrate with the pack mixture composition; and firing the carbonaceous substrate for a period of time sufficient to effectuate the formation of a protective SiC pack cementation coating on the carbonaceous substrate.

The invention further relates to a cork release agent composition for providing the clean release of spent pack composition from a carbonaceous substrate.

DESCRIPTION OF THE INVENTION

In accordance with this invention, there is provided a novel pack mixture composition useful for providing a SiC pack cementation coating for protection of carbonaceous substrates from degradation, including and most prevalently oxidation. This pack mixture composition reacts with the substrate upon firing to convert a portion of the substrate surface into SiC which protects against the oxidation of the substrate at elevated temperatures, as high as 3000° F, and thus allows the substrate to maintain its mechanical integrity for longer periods of time. The pack mixture composition comprises from about 15% to about 50% Si, from 0% up to about 25% B, from about 0.01% to about 3% $SiO_2$, the remainder of the composition comprising SiC, usually from about 40% to about 85% SiC, all by weight of the total composition. The exact elemental composition may vary slightly depending on the substrate to be coated, and on the application for which and the conditions under which the article will be used, such as the temperature and the presence of oxygen.

The term "carbonaceous" as used herein includes carbon-carbon composites which are fiber reinforced carbon matrix materials, which may include oxidation inhibitors in particulate or other form, as well as other carbon and/or graphite substrates. The phrase "pack cementation" as used herein refers to the heat driven conversion of outer surface carbon in a carbon-carbon composite to primarily silicon carbide by the infiltration of and reaction with Si liquid and/or gas and SiO gas supplied by the pack mixture which surrounds the carboncarbon article.

The pack mixture composition disclosed herein is excellently suited for use on carbonaceous substrates. The inclusion in or addition of $SiO_2$ in the pack mixture enhances the conversion of substrate carbon to SiC and results in a thicker coating. It is theorized that the $SiO_2$ in the pack mixture dissociates to form SiO and oxygen at pack cementation temperatures. The SiO is free to react with the substrate carbon, thereby forming a protective layer of SiC and. evolving CO or $CO_2$ gases. The evolution of CO or $CO_2$ removes surface carbon and results in the exposure of additional substrate carbon available for reaction with SiO and Si vapor, thus facilitating additional SiC formation.

As was previously stated, the pack mixture taught herein contains about 15% to about 50% Si, 0% up to about 25% B, about 0.01% to about 3% $SiO_2$ and about 40% to about 85% SiC. Elemental Si can be purchased from Elkem as −200 mesh, the B, in amorphous form, may be purchased from Kerr McGee as Trona TM at 1 micron, the $SiO_2$ may be purchased from Pennsylvania Glass Sand Corp. as Supersil TM at −325 mesh, and the SiC (green) may be purchased from Arendal as SI-KA TM at 1200 grit. The preferred pack mixture composition contains from about 25% to about 40% Si, from about 0% to about 15% B, from about 0.01% to about 1% $SiO_2$ and from about 44% to about 75% SiC. The most preferred pack mixture composition contains about 35% Si, about 5% B, about 0.5% $SiO_2$ and about 59.5% SiC. This composition is capable of converting both the carbon matrix and the carbon fiber of the carbon-carbon composite at essentially equal rates, resulting in a dense coating with a relatively smooth interface. Variations in the pack mixture composition, especially $SiO_2$ content, can significantly affect the thickness of the conversion coating by influencing the reaction rate between the pack mixture and the substrate. For carbon-carbon substrates it is important that the amount of $SiO_2$ in the pack mixture composition generally not exceed 3% by weight of the total pack composition, as greater than that amount may be too reactive, resulting in excessive conversion of the substrate. Preferably, the amount of $SiO_2$ in the pack mixture does not exceed 1% by weight of the total pack composition.

In some instances, it is desirable to completely convert a carbonaceous substrate to silicon carbide. This can be achieved with some carbonaceous substrates, especially those which are highly porous, by conversion with a $SiO_2$-containing pack mixture composition.

Prior to application of the pack mixture composition to the carbonaceous substrate, it is usually preferable to coat or cover the substrate with a pack release agent. The release agent aids in the removal of any pack mixture material adhering to the part surface after the cementation process has been completed. The need for a release agent is particularly important when using boron containing pack mixtures which tend to adhere to the substrate. Further, choice of an appropriate release agent tends to promote the vapor phase reaction, thus enhancing the conversion reaction.

The preferred release agent according to the subject invention is cork. The material is typically purchased with a −200 mesh particle size and a density of between 8 to 10 lbs./ft$^3$, and is commercially available from the Maryland Cork Co., Inc. However, a variety of particle sizes and densities will be effective for the purpose stated herein. For ease of application, the powdered cork is mixed with a liquid carrier, such as 0.4% aqueous solution xanthan gum. The xanthan gum can be purchased as Kelzan-S TM powder from Kelco Co.

Cork allows the reaction of the pack mixture composition with the substrate to proceed, then provides for the clean release of the pack mixture remaining after completion of the pack cementation process, without damaging the conversion coating, and consequently not exposing the substrate material. The cork prevents pack sticking by converting to a very porous low strength silicon carbide layer which is friable and therefore easily removable from the substrate surface.

Pack release agents, in general, tend to degrade and shrink during cementation forming shrinkage cracks. It is critical that the typically formed shrinkage cracks are not large enough to permit direct exposure of the carbonaceous substrate to the pack mixture. This is especially true of filter paper or other sheet-like release agents, which tend to tear, resulting in opposing edges of the release agent pulling away from each other upon continued shrinking. This increases the chance that the substrate surface will be exposed and bond to the pack mixture. Cork, however, due to its particulate nature, undergoes only minor shrinkage, which results only in a very fine crack structure. This prevents direct exposure of the substrate to the pack mixture, effectively preventing the pack mixture from bonding to the surface of the substrate.

Other practical benefits of using cork as a release agent include its relatively low cost (less than one-tenth that of filter paper products) and the ease with which the powdered cork can be mixed with a binder-containing aqueous or non-aqueous liquid carrier, such as 0.4% aqueous solution xanthan gum, and sprayed, painted or dipped onto a substrate to any desired thickness. Further, the porous film of a sprayed on cork release agent does not impede the reaction between the carbonaceous part and the pack mixture. Finally, cork is highly advantageous when the material being coated is of a complex configuration since it will conform to any surface. Filter paper or other pack release agents may be impractical in such instances.

Once the release agent has been applied to the substrate, the pack mixture may be applied over the release agent by any known method, including hand tamping of dry pack mixture, slurry fill technique, or spray coating, among others. When using the slurry fill technique or the spray coating technique it is desirable to combine the pack mixture with a liquid carrier, so that the mixture is in a fluid form. Such liquid carriers may be aqueous or non-aqueous solvents, and may further contain suitable binder materials or suitable dispersants.

When using the dry pack mixture technique, the release agent-coated substrate is loaded into a non-reactive retort that is filled with pack mixture such that the mixture covers all sides of the substrate to a thickness of at least about ½ inch. The pack mixture is hand tamped to attain a density which ensures that the substrate is fixed in place and is uniformly surrounded by enough reactive pack mixture to attain the desired conversion coating, preferrably at least about ½" thick, most preferrably about ¾" thick. The density is typically measured by using a soil tester.

When using the slurry fill technique, the release agent-coated substrate is loaded into a non-reactive retort. The retort may contain a small amount of slurried pack mixture prior to placement of the substrate in the retort, or alternatively, the slurried pack mixture may all be added after placement of the substrate in the retort. Either way, the result achieved is that the substrate is surrounded by a uniform amount of slurried pack mixture on all sides. The retort containing the substrate is then dried in air or in an oven for a time sufficient to dry the particular pack mixture used.

When using the spray coating technique, the release agent-coated substrate is first sprayed with a thin coating of pack mixture. The substrate is then dried. This process may be repeated several times in order to attain a pack mixture coating of a desired thickness. The substrate may then be placed in a non-reactive retort filled with a course grade SiC powder such that the substrate is surrounded by the powder. Alternatively, the pack-coated substrate may be placed directly into a furnace without first encasing it in a retort. The spray coating technique readily lends itself to masking of the substrate in selected areas to prevent reaction with the pack mixture when such is desired.

In each of the above methods, the packed retort, or the pack-coated substrate without the retort, is placed in a furnace which is heated to a temperature ranging between about 2900° F. and about 3300° F. This temperature is then held for a period of about 4-16 hours, depending on the reactivity of the substrate and the amount of coating pick-up desired.

Firing of the substrate should take place in an inert atmosphere, preferably argon, at slightly above atmospheric pressure.

The furnace is then cooled in an inert atmosphere until it reaches room temperature, at which time the retort or pack-coated substrate can be removed. If a retort was used, the retort is opened and the substrate removed therefrom.

The conversion coated substrate is then removed from the spent pack mixture, a process made easy by prior use of the novel cork release agent, and cleaned by rubbing the surface with an abrasive pad and rinsing it with an appropriate solvent, such as isopropyl alcohol.

The substrate now has a conversion coating, of between about 0.1-50 mils depending on which of the listed cementation techniques was used, the roughness of which is similar to the original substrate surface. The $SiO_2$-bearing pack mixture composition of the current invention generally results in increased coating thickness as compared to non-$SiO_2$-bearing compositions.

EXAMPLES

The following examples demonstrate the formation of a SiC pack cementation coating on a carbon-carbon substrate using the novel pack mixture composition disclosed herein. It is to be understood that these examples are utilized for purposes of illustration only, and are not intended, in any way, to be limitative of the present invention.

For purposes of these examples, the substrates used were a series of compositionally identical carbon-carbon composite coupons. Each was cleaned to ensure that no foreign matter was present to interfere with the cementation process. This was accomplished by first scrubbing the coupon, then wiping it down with isopropyl alcohol and finally oven drying the coupon for 15-30 minutes at about 190° F. Pack cementation processing, as described in Examples 1-4, was then used to coat the coupons.

EXAMPLE 1

A cleaned coupon was spray coated with a cork release agent according to the following procedure. The cork release agent, which consisted of an 0.4% aqueous solution xanthan gum and powdered cork in a ratio of about 7.5:1, was prepared by vigorously mixing the cork solution in a paint mixer for 15 minutes. This solution was sprayed over the entire surface of the coupon with an air brush. The release agent coating was then dried in an air oven at 190° F. for about 15 to 30 minutes. The coating was approximately 5-10 mils thick. A second coating of cork was similarly applied, increasing the total thickness of the cork to about 15 mils, to ensure that the entire substrate surface was covered.

The pack mixture was prepared by blending the following powders in a twin-shell mixer for 30 minutes: 59.5% SiC green (1200 grit), 5% amorphous B (about 1 micron), 35% Si (−200 mesh), and 0.5% $SiO_2$ (−325 mesh). A slurry was prepared by combining the pack formulation with 0.4% aqueous solution xanthan gum in a ratio of 1:1 by weight, and mixing in a paint shaker for 15 minutes. The slurry was then sprayed over the dried cork release layer to a thickness of about 50 mils. Several spray applications were necessary to achieve this thickness.

The coupon was then dried at about 190° F. in an air oven for about 30 to 45 minutes. It was then loosely packed in 240 grit SiC powder in a graphite retort. The retort was fired in a resistance heated furnace for 8 hours at 3200° F. in an argon atmosphere at slightly above atmospheric pressure.

After the cementation process was completed, the 240 grit SiC powder was removed from around the slurry encased coupon. The slurry had formed a hard shell around the coupon during firing. The coupon was easily removed by merely cracking off the slurry shell. Any cork release agent residue was easily brushed from the coupon surface. The coupon was rubbed lightly with an abrasive pad and then cleaned with isopropyl alcohol. The coated coupon surface was smooth and did not appear roughened by the conversion process. A cross-section of the coupon revealed a SiC conversion coating had formed with a uniform thickness of about 0.25 mils.

EXAMPLE 2

A coupon prepared identically to the coupon in Example 1, up to and including application of the cork release agent, was used for this Example 2. The pack mixture composition for this Example was identical to that used in Example 1, however for this Example the pack mixture was used in a dry state.

The coupon was then packed in a cardboard-lined graphite retort such that there was ¾" pack mixture surrounding the coupon on all sides and surfaces. The pack mixture was hand tamped to achieve a pack mix density of approximately 1.32g/cc. The packed retort was heated to 3200° F. and soaked for 8 hours in an Argon atmosphere at slightly above atmospheric pressure.

After the cementation process was completed, the retort was disassembled and the fired pack mixture was fractured. The coupon was easily removed and cleaned as in Example 1.

EXAMPLE 3 AND 4

The processing used in Example 2 was repeated on identical coupon substrates using previously patented pack mixtures containing 60% SiC (green), 35% Si and 5% B for Example 3, and 60% SiC, 30% Si, 1%B and 9% $Al_2O_3$, for Example 4.

Table 1 below shows a comparison of Examples 2, 3 and 4, all of which were processed using a dry pack mixture. As can be seen, the novel $SiO_2$ containign pack mixture of Example 2 produced the greatest weight gain per unit area of substrate surface. Thus, the inclusion of $SiO_2$ in the pac mixture resulted in a thicker coating.

TABLE 1

| Ex. | Pack Mix Composition | Surface Area ($cm^2$) | Initial Mass (grams) | Final Mass (grams) | Mass Change per Unit Surface Area ($mg/cm^2$) |
|---|---|---|---|---|---|
| 2 | 59.5% SiC 35% Si 5% B 0.5% $SiO_2$ | 62.053 | 28.4387 | 32.4848 | 65.204 |
| 3* | 60% SiC 35% Si 5% B | 48.650 | 13.4619 | 14.4205 | 19.704 |
| 4** | 60% SiC 30% Si 1% B 9% $Al_2O_3$ | 61.893 | 28.3735 | 28.9988 | 10.103 |

*composition from patent #4,465,777.
**composition from patent #4,544,412.

It is to be understood that the forgoing examples have been provided to enable those skilled in the art to have representative examples by which to evaluate the invention and that these examples should not be construed as any limitation on the scope of this invention. Inasmuch as the composition of the pack and the processing parameters employed in the present invention can be varied within the scope of the total specification disclosure, neither particular components, relative amounts of the components, nor exact operating parameters exemplified herein shall be construed as limitations of the invention.

What we claim is:

1. A method for protecting a carbonaceous substrate from degradation at temperatures above about 800° F. comprising:
    a) preparing a pack mixture composition of from about 15% to about 50% Si, 0% up to about 25% B, from about 0.01% to about 3% $SiO_2$ and from about 40% to about 85% SiC, all by total weight of said pack mixture composition;
    b) coating said carbonaceous substrate with a release agent;
    c) surrounding said release agent-coated carbonaceous substrate with said pack mixture composition; and
    d) firing said carbonaceous substrate for a period of time sufficient to effectuate the formation of a protective SiC pack cementation coating on said carbonaceous substrate.

2. The method as in claim 1 wherein said composition comprises about 25% to about 40% Si, 0% up to about 15% B, about 0.0.1% to about 1% $SiO_2$ and about 44% to about 75% SiC, all by total weight of said coating composition.

3. The method as in claim 1, wherein said composition comprises about 35% Si, about 5% B, about 0.5% $SiO_2$ and about 59.5% SiC, all by total weight of said coating composition.

4. The method as in claim 1 wherein said pack mixture composition is in a powder form.

5. The method as in claim 4 wherein said powder composition is applied to said substrate by a dry pack mixture technique.

6. The method as in claim 1 wherein said pack mixture composition is combined with a liquid carrier and is in fluid form.

7. The method as in claim 6 wherein said fluid composition is applied to said substrate by a slurry fill technique.

8. The method as in claim 6 wherein said fluid composition is applied to said substrate by a spray coating technique.

9. The method as in claim 1 wherein said release agent is a slurry comprising cork suspended in a suitable binder-containing liquid carrier.

10. The method as in claim 9 wherein said binder-containing liquid carrier is 0.4% aqueous solution xanthan gum.

11. The method as in claim 1 wherein said firing is at about 2900° F. to about 3300° F.

12. The method as in claim 11 wherein said firing is at about 3200° F.

13. The method as in claim 1 wherein said period of time sufficient to effectuate the formation of a protective coating on said carbonaceous substrate is about 4 to about 16 hours.

14. The method as in claim 13 wherein said period of time is about 8 hours.

* * * * *

UNITED STATES PATENT AND TRADEMARK OFFICE
CERTIFICATE OF CORRECTION

PATENT NO.  : 5,209,950

DATED       : May 11, 1993

INVENTOR(S) : Ira C. Schwartz, Orlando L. NOche, Keith Klein

It is certified that error appears in the above-identified patent and that said Letters Patent is hereby corrected as shown below:

Column 8, Line 29 "0.0.1%" should read --0.01%--

Signed and Sealed this

First Day of February, 1994

Attest:

BRUCE LEHMAN

Attesting Officer    Commissioner of Patents and Trademarks